United States Patent [19]

Hartness

[11] 4,300,330
[45] Nov. 17, 1981

[54] BOTTLE LOADING MACHINE

[75] Inventor: Thomas S. Hartness, Greenville, S.C.

[73] Assignee: Hartness International, Inc., Greenville, S.C.

[21] Appl. No.: 93,869

[22] Filed: Nov. 13, 1979

[51] Int. Cl.³ .................. B65B 21/06; B65B 21/18
[52] U.S. Cl. .................................. 53/539; 53/247
[58] Field of Search ............... 53/247, 539, 248, 443; 414/59, 71

[56] References Cited

U.S. PATENT DOCUMENTS

| | | | |
|---|---|---|---|
| 2,350,560 | 6/1944 | Kimball | 53/62 |
| 2,615,289 | 10/1952 | Hickin | 53/247 X |
| 2,838,896 | 6/1958 | Currivan et al. | 53/539 |
| 2,898,715 | 8/1959 | Cella | 53/62 |
| 3,209,515 | 10/1965 | Harpenau | 53/247 |
| 3,292,341 | 12/1966 | Frost | 53/247 X |
| 3,325,967 | 6/1967 | Wild | 53/262 |
| 3,864,890 | 2/1975 | Ullman | 53/247 X |
| 4,078,361 | 3/1978 | Hartness et al. | 53/248 X |

Primary Examiner—James F. Coan
Attorney, Agent, or Firm—Bailey, Dority & Flint

[57] ABSTRACT

A bottle loading machine having a bottle transfer conveyor transferring charges of bottles in aligned rows to a case loading station for being deposited through a grid set into a case carried therebelow. Aligned pairs of gripping arms are carried in the path of the transfer conveyor directly over the grid set for receiving the aligned rows of bottles. A pair of abutments are carried adjacent the forward end of the grid set for tilting the leading bottle of the charge of bottles so that when the bottles are dropped, they drop freely into the case. A plurality of stops are carried on a pivotal arm positioned adjacent the junction of the transfer conveyor and the grid set for restraining the incoming bottles as the charge is being dropped into the case.

7 Claims, 8 Drawing Figures

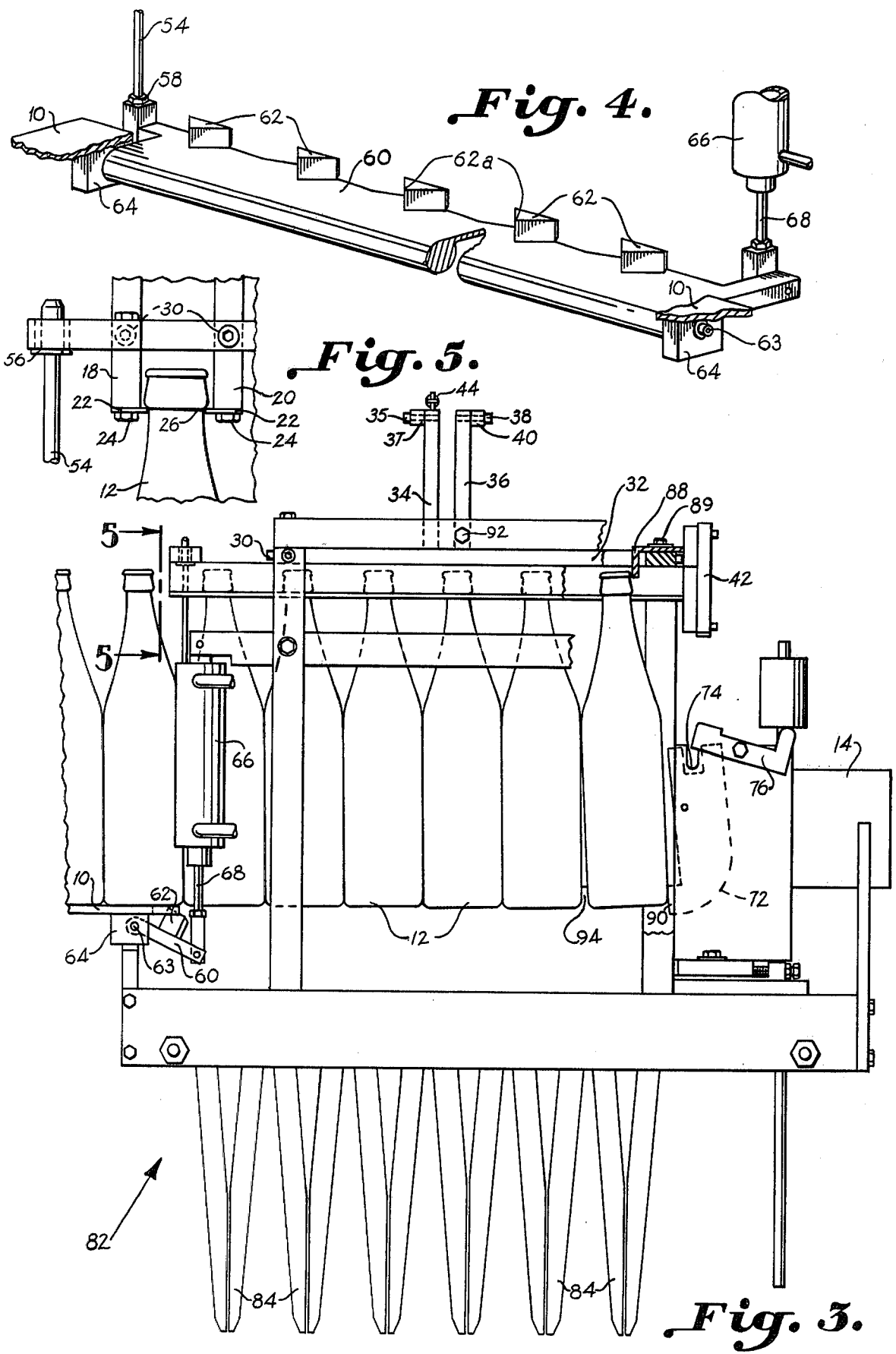

BOTTLE LOADING MACHINE

BACKGROUND OF THE INVENTION

Normally, articles such as bottles are loaded into cases by a case packer which utilizes a shift bar assembly which supports the charge of bottles from the bottom prior to dropping. While these shift bar assemblies work satisfactorily they restrict the speed of operation of the case packer in that all of the bottles forming part of the charge must drop completely through the shift bar assembly before a new charge of bottles can be loaded on top of the grid. In order to increase the production rate of the case packer, one particular case packer drives the conveyor feeding the bottles to the grid set at two separate speeds. Such a drive mechanism is complicated and must be synchronized with the drop mechanism.

In order to obtain high production in systems wherein a shift bar assembly is utilized, the infeed conveyor can be driven at a higher rate of speed to compensate for the lost time required for the bottles to drop through the drop bar assembly. One problem with driving the incoming conveyor at a higher than normal rate of speed is that the bottles are banged together as the charge of bottles are loaded into the case packer often breaking or damaging the bottles.

It is also important to utilize some sort of mechanism for holding back the flow of bottles onto the grid set while a charge of bottles is being loaded into the case. Normally, this is accomplished by overhead clamps that press down on top of the bottles.

One problem with utilizing clamps that press down on the top of the bottles when restricting the flow of the bottles to the grid set is that often creeping will take place since the conveyor on which the bottles are positioned normally continues to run.

Attempts have also been made to utilize stops that are raised vertically from the bottom into the path of the incoming articles. Examples of such a device are shown in U.S. Pat. Nos. 4,078,361, 3,325,967, 2,350,560 and 2,898,715. It is noted that in each of these devices, the stop is raised vertically into a gap provided between the bottles.

While some case packers in the past have utilized gripping arms for gripping a charge of bottles by their necks, it is applicant's understanding that only one arm of each pair of gripping arms was moved when dropping the bottle through the grid set into the case. As a result, the crown carried adjacent the top of the bottle would strike the fixed arm preventing a clean drop of the bottle into and through the grid set and also tends to loosen or remove the crown.

SUMMARY OF THE INVENTION

In accordance with the present invention, it has been found that articles such as bottles can be loaded into a case at a high rate of speed if the bottles are held by their tops prior to dropping through the grid set into the case. The machine includes aligned pairs of gripping arms carried in the path of the transfer conveyor directly over the grid set. The gripping arms are shifted to a first position wherein they provide opposed tracks for receiving the bottles from a respective row and for supporting the bottles by the neck. A power operated cylinder is utilized for pivoting each of the arms away from the necks of the bottles when dropping the bottles into the grid set. As a result, each arm is pivoted out of the drop path of the respective bottle.

A first abutment is carried adjacent a forward end of the gripping arms for engaging a top portion of the leading bottle of the charge of bottles and a second abutment is carried in the path of the leading bottle slightly forward and below the first abutment engaging a side wall of the leading bottle adjacent the bottom thereof. As a result, as the charge of bottles are loaded into the tracks provided by the gripping arms, the leading bottle is tilted at an angle off of the vertical providing a gap between the leading bottle and the next following bottle. This permits the bottles to drop freely when released by the gripping arms through the grid set.

In order to prevent binding of the bottles when the gripping arm releases the charge of bottles, a pivotal arm is provided adjacent the junction of the bottle transfer conveyor and the grid set. A plurality of stops are carried on the pivotal arm. These stops are pivoted upwardly into the path of the incoming bottles. A pivot joint which supports the pivot arm is distal from the location of the stops on the pivot arm so that the pivot arm is pivoted upwardly along an arcuate path into the path of the incoming bottles. The operation of the pivotal stops is synchronized with the operation of the mechanism releasing the arms for dropping the bottles.

Accordingly, it is an important object of the present invention to provide a bottle loading machine that is relatively simple in operation and is capable of operating at a higher production rate than normal with a minimum of damage to the articles being loaded into the cases.

Another important object of the present invention is to provide a bottle or article loading machine wherein the lead article of the charge of articles is tilted at an angle relative to the following articles so as to provide sufficient clearance to permit free dropping of the bottles into and through the grid set.

Another important object of the present invention is to provide a bottle loading machine with a charge dropping mechanism that permits a transfer conveyor to run at a slower rate for a particular loading rate than when a slide bar drop assembly is utilized.

These and other objects and advantages of the invention will become apparent upon reference to the following specification, attendant claims, and drawings.

BRIEF DESCRIPTION OF THE DRAWINGS

FIG. 3 is an enlarged side elevational view.

FIG. 4 is an enlarged perspective view illustrating the pivotal stops.

FIG. 5 is an enlarged fragmentary elevational view taken along line 5—5 of FIG. 3.

DESCRIPTION OF THE PREFERRED EMBODIMENT

Figure 1:
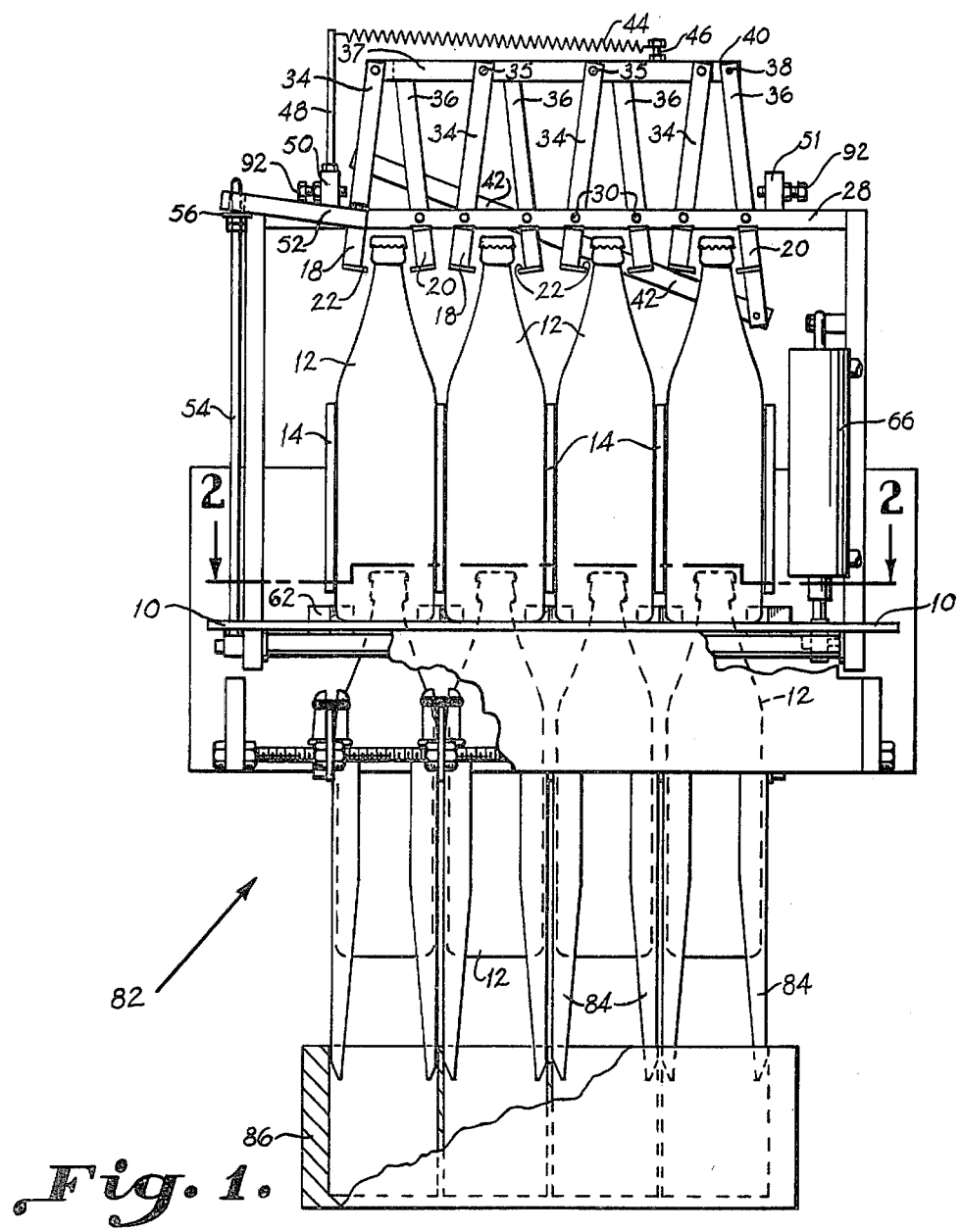
FIG. 1 is an elevational view looking into the case packer at the junction of the transfer conveyor and the grid set.
Figure 2:
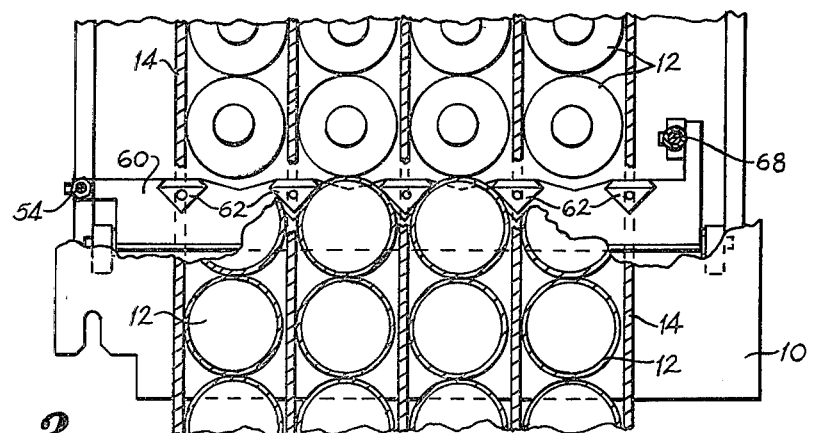
FIG. 2 is a plan view partially taken along line 2—2 of FIG. 1.
Figure 6:
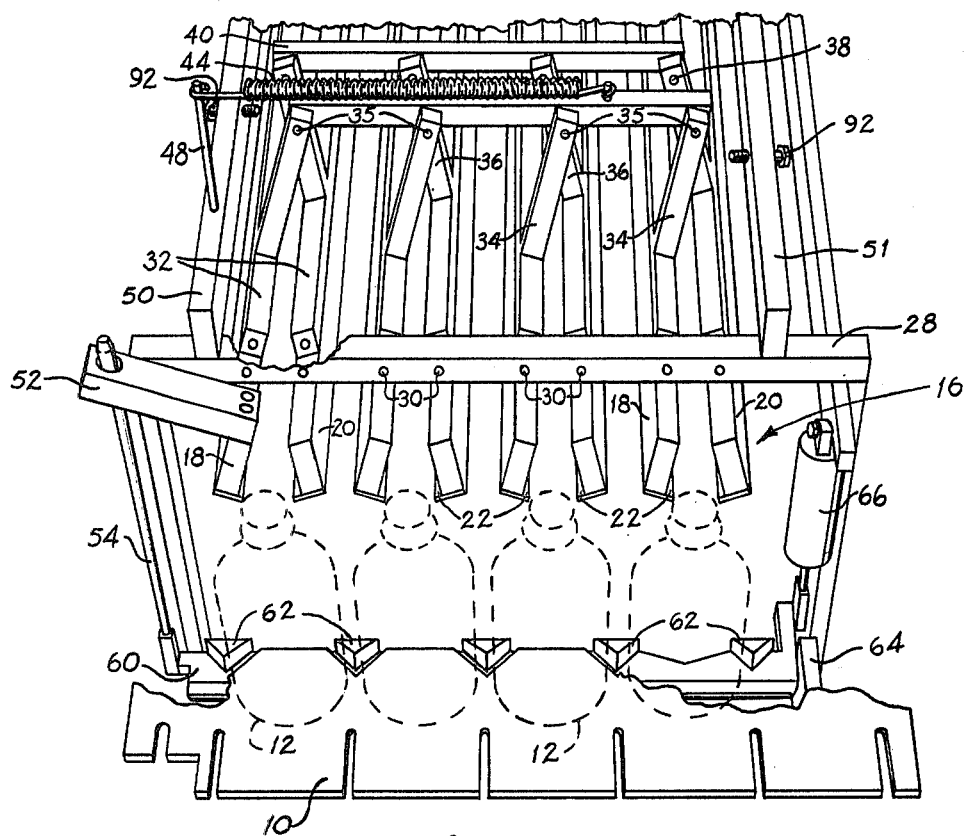
FIG. 6 is an enlarged perspective view showing a portion of a case packer with the gripping arms provided thereon.
Figure 7:
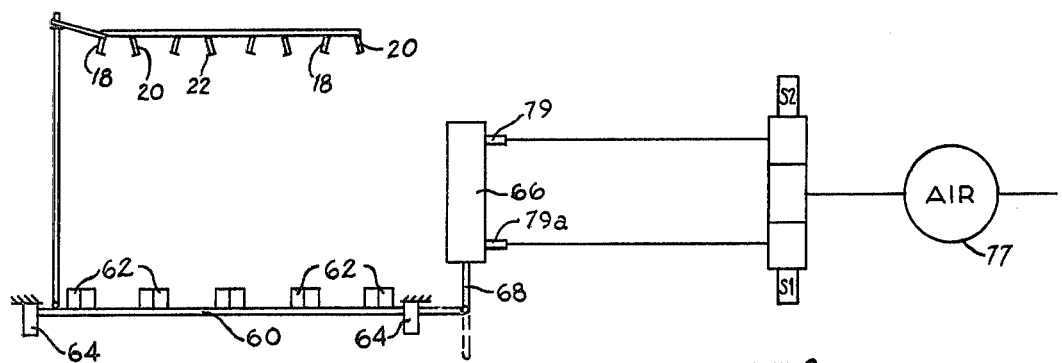
FIG. 7 is a schematic diagram illustrating the cooperation of the gripping fingers and pivotal stops and the pneumatic controls therefor.

Referring in more detail to FIGS. 1, 3 and 6, the incoming bottles are fed from a transferring conveyor onto a plate 10. The bottles 12 are separated into four rows by divider plates 14. After the bottles 12 pass over the plate 10, each row of bottles is fed between a pair of aligned gripping arms generally designated by the reference character 16. Each pair of gripping arms 16 include a left hand gripping bar 18 and a right hand gripping bar 20. Secured to the bottom of each of the bars 18 and 20 is a horizontally extending wear resistant plate 22 made of any suitable material such as nylon or metal. This plate 22 is secured to the bottom of the vertical arms 18 and 20 by means of bolts 24. As seen in FIG. 5, the horizontal plate 22 extends inwardly defining a flange which engages the neck of the bottle directly below the radially extending transfer shoulder 26. Thus, when the arms 18 and 20 are in the closed position as illustrated in FIG. 5, a charge of bottles is supported between the opposed horizontal flanges 22 carried at the bottom of the vertical arms 18 and 20.

The vertical arms 18 and 20 are pivotally secured on a fixed horizontal bar 28 by means of pins 30. The pins 30 extend into blocks 32 carried on the vertical extending members 18 and 20. Extending upwardly from the arms 18 are vertical extensions 34 that are pivotally connected by means of pins 35 to a bar 37 that extends across the top of the grid set. It is noted that all of the extensions 34 are connected to the left hand arm of each pair of aligned gripping arms. Similarly, the right hand gripping arms 20 have vertically extending arms 36 extending upwardly thereto which are, in turn, pivotally connected by means of pivot points 38 to a horizontal bar 40. The movement of the pivot arms 34 and 36 are tied together by a linkage arm 42 such as shown in FIG. 1. This linkage arm 42 is pivotally connected by means of a pin to the lower end of one of the arms 36 and is also pivotally connected by means of a pin to one of the arms 34 so that when the arms 34 move, simultaneously therewith, the arms 36 move. A spring 44 is connected between a post 46 carried on top of the horizontal linkage 38 and a post 48 extending upwardly from part of a fixed frame member 50. The purpose of the spring 44 is to pivot the arms 34 and 36 to the closed position such as shown in FIG. 5 wherein the lower horizontal members 22 provide tracks for receiving the necks of bottles.

The arms 18 and 20 are pivoted apart to the positions shown in FIGS. 1 and 6 by raising a lever 52 that is secured to one of the arms 18.

The lever 52 is raised by a lifting rod 54 that has a washer 56 provided adjacent the top thereof. This washer bears against a bottom surface of the lever 52 when raising the lever arm 52. It is noted that the rod 54 extends upwardly through a hole provided in the end of the lever. The lever is pivoted back to its original lower position by the spring 44. The lower end of the lifting rod is attached through a threaded end and nut 58 to a pivot plate 60 which has a plurality of triangular shaped stops 62 provided therein for stopping the incoming bottles while a charge of bottles are being deposited in a case.

Referring to FIG. 4, the pivot plate 60 is pivoted on pins 63 that are suitably journaled in blocks 64 supported by the frame. The plate 60 is positioned directly below the transfer plate 10 between the infeed conveyor and the grid set such as shown in FIG. 6. A pneumatic cylinder 66 is connected by means of piston rod 68 to the pivotal plate for raising and lowering the plate. The plate, when in a raised position such as shown in FIG. 6, causes the stops 62 to be positioned in the path of the incoming bottles 12. It is noted that the triangular shaped stops 62 are positioned on the pivot plate distal from the pivot joint so that when the pneumatic cylinder 66 lifts the pivot plates 60, the stops travel along an arcuate path into the gap provided between the incoming bottles. As a result of the stops traveling on an arcuate path, the points 62a of the triangular shaped stops are first inserted into the gaps and then the main body of the stop 62 follows centering any misaligned bottles.

Figure 8:
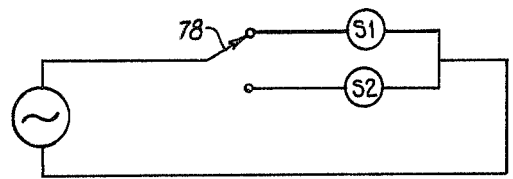
FIG. 8 is a schematic diagram illustrating the controls for the solenoid valves used in the pneumatic circuit.

The pneumatic cylinder 66 is activated by a conventional signal indicating mechanism that is carried on the case packer. This mechanism is illustrated in FIG. 3 of the drawings and includes a plurality of pivotal plates 72 each of which is carried in the path of a row of incoming bottles. When these pivotal plates are engaged at the bottom such as shown in FIG. 3, they are pivoted so that there is an aligned slot 74 extending across the machine. When this slot is provided adjacent each row of bottles, the lever arm 76 drops into the slot causing an electrical switch 78 as shown in the electrical circuit diagram in FIG. 8 to be closed energizing solenoid valve S1 which in turn allows air to flow from a pressurized source of air 77 to the lower port 79a of the cylinder 66. When air is supplied to the lower port of cylinder 66, it causes the piston rod 68 associated therewith to be extended upwardly raising the stop 62 into the path of the incoming bottles. It also causes arms 18 and 20 to pivot apart for dropping the bottles through a conventional grid set generally designated by the reference character 82. Guide fingers 84 form part of the grid set and guide the bottles into a case 86 carried directly therebelow. As seen in FIG. 1, the rows of bottles 12 are maintained separated by conventional divider plates 14.

In order to ensure that the bottles drop freely, the lead bottle as shown in FIG. 3 is inclined away from the vertical axis engaging a first and second abutment 88 and 90, respectively. Positioned adjacent the end of the grid set in the path of each row of bottles is a right angle member 88 which is secured by means of a bolt 89 onto the frame of the grid set. The angle member 88 has a vertically extending flange which strikes the crown of the bottle directly above the bottom surface of the crown. This causes the top of the bottle to stop at that position.

The second abutment 90 which is carried on the bottom of the pivotal lever 72 is positioned forwardly of the first abutment 88 and in the path of the bottom wall of the bottles. As a result, after the top or crown has engaged the top abutment 88, the bottom of the leading bottle engages the abutment 90 tilting the bottle. A gap 94 then develops between the lead bottle and the next following bottle. The angle that the lead bottle assumes is controlled by the position of the vertical flange of the first abutment 88. This can be adjusted by loosening the nut 89 and sliding the first abutment forward or rearwardly. The horizontal flange portion of the first abutment 88 has an elongated slot provided therein so as to permit the flange member 88 to be adjusted. As a result of the gap being provided between the leading bottle and the next following bottle, when the bottles are dropped this space or gap permits the bottles to drop freely without binding against each other. It also provides a means of placing the bottles in the proper relationship to the bottle stop 62.

Referring back to FIGS. 1 and 6, the distance that the pivotal arms 18 and 20 open and close is controlled by adjustable bolts 92. These adjustable bolts 92 engage the pivotal arms 34 and 36 limiting the movement thereof. The bolts 92 are carried by side frame members 50 and 51 which form part of the framing that supports the pairs of gripping arms.

The transfer plate 10 is provided with adjustment slots so that pivot plate 60 may be moved back and forth so that the bottle stops 62 may insert properly in the voids between the bottles 12.

In summarizing the operation, the transfer conveyor feeds four rows of incoming bottles over a transfer plate 10 onto the case packing machine. The necks of the bottles pass between the opposed arms of each pair of gripping arms with the flange portion 22 supporting the bottles by their transfer ring 26. As the bottles are pushed along the tracks provided by each pair of gripping arms, the top of the leading bottle first strikes the first abutment 82. The bottom of the lead bottle continues traveling until it strikes the second abutment 90 tilting the lead bottle providing a gap therebetween. When all of the bottles are properly loaded within each row, the drop arm 76 falls within the gap triggering the electrical switch 78 in a conventional manner. Upon triggering of the switch 78, solenoid valve S1 is energized causing air to flow in the bottom port of pneumatic cylinder 66 retracting the piston rod 68. When the piston rod 68 is retracted, the pivot plate 60 is pivoted upwardly causing the stops 62 to move in an arcuate path into the space between bottles located on the support plate 10 and the last bottles carried by the pivotal arms 18 and 20. Simultaneously with the raising of the stops 62 into the path of the incoming bottles, the gripping arms 18 and 20 are pivoted away from each other allowing the bottles supported therebetween to be dropped. It is noted that as a result of the linkage connection both of the arms 18 and 20 are pivoted away from the bottle allowing the bottles to drop freely into the grid set. Immediately after the bottles are released by the neck, the switch 78 energizes solenoid valve S2 causing air to flow into the upper port 79 of the pneumatic cylinder 66. As air flows into the upper port, the piston rod 68 is extended pivoting the stop 62 in an arcuate path out of the incoming bottles. Simultaneously therewith, the gripping arms 18 and 20 are pivoted to the closed position such as shown in FIG. 5 for receiving another charge of bottles. It is noted that the operation of the pivot plate 60 upon which the stops 62 are carried is synchronized with the operation of the gripping arms through the vertical linkage arm 54 and the spring 44.

While a preferred embodiment of the invention has been described using specific terms, such description is for illustrative purposes only, and it is to be understood that changes and variations may be made without departing from the spirit or scope of the following claims.

What is claimed is:

1. A bottle loading machine having a bottle transfer means for transferring charges of bottles in aligned rows to a case loading station for being deposited through a grid set into a case carried therebelow comprising:

aligned pairs of gripping arms carried in the path of said transfer means directly over said grid set;

means for shifting each pair of said gripping arms to a first closed position for receiving bottles from a respective row and supporting said bottles by the neck of said bottles, and each of said pairs of gripping arms when in said first position defining a track, one end of said track being opened so that a plurality of bottles can be loaded in succession onto each respective track;

means for pivoting each arm of each respective pair of arms away from said necks of said bottles to an open position for dropping said bottles freely into said grid set for being deposited into said case.

2. The bottle loading machine as set forth in claim 1 further comprising:

a first abutment carried adjacent a forward end of said gripping arms for engaging a top portion of the leading bottle of said plurality of bottles; and a second abutment carried in the path of said leading bottle slightly forward and below said first abutment engaging a side wall of said leading bottle adjacent the bottom thereof;

whereby bottles following said lead bottle presses said lead bottle into said first and second abutments tilting said lead bottle and providing a gap between said lead bottle and said next following bottle permitting said bottles to drop freely through said grid set when said arms are pivoted away from said necks of said bottles.

3. The bottle loading machine as set forth in claim 1 further comprising:

a pivot arm carried adjacent the junction of said bottle transfer means and said grid set;

a plurality of stops carried on said pivot arm;

means for pivoting said pivot arm upwardly bringing said stops into the path of said incoming bottles, and means for synchronizing the pivoting of said pivot arm upwardly with the dropping of said bottles so that said incoming bottles do not interfere with the dropping of said bottles through said grid set.

4. The bottle loading machine as set forth in claim 3 further comprising:

a pivot joint supporting said pivot arm adjacent an arm distal from the location of said stops on said pivot arm;

whereby when said pivot arm is pivoted upwardly, said stops travel along an arcuate path into the path of said incoming bottles.

5. The article loading machine as set forth in claim 1 further comprising:

means for tilting at least one of said bottles of each row of bottles carried over said grid set providing a gap between the next adjacent bottle;

whereby when said bottles are dropped, they are dropped uniformly.

6. An article loading machine having an article transfer means for transferring charges of articles in aligned rows to a case loading station for being deposited through a grid set into a case carried therebelow comprising:

means for supporting a charge of articles in aligned rows over said grid set;

a first abutment carried in the path of the first article of each row engaging a top portion of said first article of each row;

a second abutment carried in the path of said leading article of each row slightly forward and below said first abutment engaging a wall of said leading article adjacent the bottom thereof;

said first and second abutments tilting said leading article relative to the next following article providing a gap therebetween;

whereby when said supporting means drops said charge of articles said articles drop freely.

7. An article loading machine having an article transfer means for transferring charges of articles in aligned rows to a case loading station and means for dropping said charge of articles through a grid set into a case carried therebelow comprising:

a pivot arm carried adjacent the junction of said article transfer means and said grid set;

a plurality of stops carried on said pivot arm;

said stops being triangular in shape for fitting into a gap provided between adjacent articles;

means for pivoting said pivot arm upwardly bringing said stops into the path of said incoming articles, and means for synchronizing the pivoting of said pivot arm upwardly with the dropping of said articles so that said incoming bottles do not interfere with the dropping of said bottles through said grid set.

* * * * *